United States Patent Office 3,530,040
Patented Sept. 22, 1970

3,530,040
TEST COMPOSITION, DEVICE AND METHOD FOR DETECTING UREA IN AQUEOUS FLUIDS
Elsie June Shrawder and William Fred Hendershot, Elkhart, Ind., assignors to Miles Laboratories, Inc., Elkhart, Ind., a corporation of Indiana
No Drawing. Continuation-in-part of application Ser. No. 388,718, Aug. 10, 1964. This application Aug. 25, 1967, Ser. No. 663,211
Int. Cl. G01n 31/14
U.S. Cl. 195—103.5
15 Claims

ABSTRACT OF THE DISCLOSURE

Improved test composition, device and method for colorimetrically detecting urea in aqueous fluids comprising urease, a pH indicator, a buffer for controlling the pH of the test composition, and, as a color stabilizer a combination of albumin and a heteropolysaccharide. The test composition is preferably incorporated wth a carrier member such as bibulous paper.

CROSS REFERENCES TO RELATED APPLICATIONS

This is a continuation-in-part application based on co-pending U.S. application Ser. No. 388,718 filed on Aug. 10, 1964 and now abandoned.

BACKGROUND OF THE INVENTION

A means for the accurate determination of urea in fluids is of great importance not only in the early detection of physiological disorders by estimating the urea content of body fluids, but also in industrial fluids and agricultural products where the urea content must be controlled within certain limits.

For example, a urea detecting means is extremely useful to an individual with a known kidney dysfunction who must control his diet or otherwise regulate his protein metabolism and must frequently be guided in this regard by a regular check on the concentration of his blood urea. But beyond its usefulness in regular testing in known kidney dysfunction by both patients and physicians, a urea indicator can also be used efficiently in routine urea analyses of body fluids in hospitals and physicians' offices. Moreover, in the industrial area, urea is an important addition to process fluids such as plating baths and a quick means to determine the concentration of urea therein is of great value. Urea itself is used as a fertilizer and a quick means for assaying this material is important as a control measure in its production and use.

Such means for the determination of urea nitrogen in fluids, whether the fluids be industrial or physiological, is of greatest value, if the test method is conveniently rapid, reliable and simple enough for the technician to learn with ease. Moreover, in the case of medical diagnosis, the method must be accurate enough to serve the clinician and sensitive enough to reflect variations in the patent's condition. Additionally and importantly, any test composition and color developed therewith must be adequately stable.

DESCRIPTION OF THE PRIOR ART

Procedures for the determination of urea in fluids are well known in analytical chemistry. One such procedure utilizes chemical hydrolysis and requires special apparatus not always available in a routine laboratory. Another procedure employs a direct colorimetric reaction of urea in a protein-free filtrate with an organic reagent such as diacetyl monoxime. Still another involves a test which depends on the action of the enzyme urease to convert urease to an amonium salt which is measured by titration or nesslerization. These prior procedures have the disadvantage that they all require a considerable amount of skill and familiarity with complicated laboratory techniques.

More recently, a highly sensitive enzymatic type test composition for the colorimetric determination of urea in fluids has been developed which has greatly simplified these determinations. This particular test composition, which, in one of the more particular embodiments comprises a bibulous paper strip impregnated with active ingredients, is capable of producing a color change when contacted with a fluid containing urea. The various colors or hues produced correspond to various concentrations of urea present in the fluid. If the hue produced is interpreted immediately after formation, an exceptionally accurate urea determination is possible. However, if the interpretation of the color or hue is delayed for up to as long as 60 seconds, the urea determination becomes erratic. In many instances an immediate color interpretation is not always conveniently possible, and therefore a composition which can accurately reflect the urea concentration even after a delay of up to 60 seconds is most desirable and beneficial.

OBJECTS OF THE PRESENT INVENTION

It is therefore a primary object of this invention to provide an improved colorimetric detecting means which possesses high specificity and sensitivity for determining urea in fluids and is highly color stabilized.

Another object of this invention is to provide a color stabilized colorimetric type test composition which is capable of detecting urea when the quantity of fluid available is limited.

SUMMARY OF THE INVENTION

The test composition of this invention comprises a unique combination of an enzyme system, an indicator system, a color stabilizer and a buffer system for providing the composition with an optimum pH environment. The combined systems in conjunction with this color stabilizer cooperate in a manner such that when the enzyme system acts upon urea present in a fluid being tested, the indicator system undergoes a stabilized color change which will accurately reflect the concentration of urea present in said fluid.

The basic enzymatic reaction underlying this invention is known, especially in the instance where the enzyme system contains urease. Urease catalyzes the hydrolysis of urea to produce principally ammonia and carbon dioxide and/or ionized species thereof, depending upon the prevailing pH conditions of the enzyme reaction system. This enzymatic hydrolysis of urea can be simply represented by the following reaction sequence:

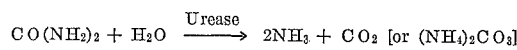

A product of this hydrolysis can be determined by means of an indicator system. For example, when the indicatory system includes a pH indicator comprising a dye that is color sensitive to changes in pH, contact of said system with a product of this hydrolysis produces a color change in said dye which can be represented by the following reaction sequence:

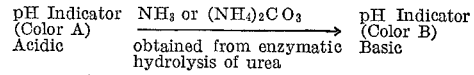

Unless Color B has been color stabilized, color fading will occur.

DESCRIPTION OF THE PREFERRED EMBODIMENTS

The composition of this invention can be color stabilized by introducing into the composition a color stabilizer comprising a novel combination of albumin and a heteropolysaccharide. The albumin constituent may be defined as a proteinaceous material soluble in the absence of salt at the isoelectric point and coagulated by heat. Exemplary of the albumins are egg albumin or ovalbumin, serum albumin and myoalbumin. Numerous other albumins found in the fluids of plants and animals can also be used.

The other ingredient is a heteropolysaccharide material. Such materials include, for example, gum arabic (*Acacia senegal*), mesquite gum (*Prosopsis juliflora*), Damson gum, gum tragacanth (*Astragalus gummifer*), Indian gum (*Anogeissus latifolia*) and the like. The above gums are generally obtained from plants in the form of a thick, mucilaginous water-soluble excretion.

It has been found that optimal color stabilization of the test composition is obtained when certain weight ratios and particular concentrations of these essential ingredients are utilized. Preferably the gum material and albumin are combined in a weight ratio of about 2:1. In other words, for every 2 g. of gum material present in a color stabilizing agent, there is present 1 g. of albumin. However, a weight ratio of gum to albumin as high as 4:1 and as low as 0.5:1 can be used. A weight ratio of gum to albumin greater than 6:1 and less than 0.2:1 is normally undesirable.

The concentration of color stabilizing agent incorporated in a composition should also be controlled within certain limits. Preferably, the color stabilizing agent is present in the composition of this invention in a concentration of about 2% based on the total weight of the composition. However a concentration as high as 4% and as low as 1% can be used. Generally a concentration greater than 7.7% or lower than 0.5% is unsatisfactory.

In formulating the enzyme system of this invention, any enzyme capable of hydrolyzing urea can be used. The enzyme urease is particularly well suited for use in this invention since urease is one of the few enzymes which is specific for the hydrolysis of urea. In addition, urease can be isolated quite readily from numerous bacteria and fungi as well as from various meals such as jack bean meal. Since there are numerous methods and techniques for isolating urease, the urease which is commercially available possesses a wide range of physical properties. Water-soluble urease is preferred for use in this invention.

The exact chemical mechanism of this novel color stabilization is not known, but it is believed that the novel combination of ingredients somehow forms a stable adsorption product with the pH indicator dyestuff.

Although most of the common buffer systems may be utilized, in order to ensure maximum urea sensitivity while at the same time effecting the desired degree of pH control, a buffer capable of producing ammonium ions is preferably used in the composition of this invention. In using this buffer system, it has been found that a relatively small amount of ammonium salts, released by the enzymatic hydrolysis of urea, produces, or at least allows, a relatively large change in the pH of the composition. The result of such a phenomenon is that the composition is sensitive to small incremental changes in urea concentration.

In the present invention, the ammonium ion producing buffer is utilized to provide the test composition during use with an optimum pH range for both the tautomeric activity of the indicator and the enzymatic activity of the urease. In regard to the indicator material, the pH of the system is preferably initially set in a range between the midpoint of the transition interval of the indicator and a point adjacent to and on the acid side of this transition interval. The transition interval is defined as that pH range over which an indicator will exhibit a color change. For example, for bromthymol blue the transition interval lies between pH 6.0 and 7.6. Therefore, the midpoint of the transition interval of bromthymol blue is 6.8. In this illustration a pH adjacent to the transition interval of bromthymol blue, but on the acid side thereof would be a pH of slightly below 6.0. Although the above noted range is preferable, the pH of the system may initially be set to any point within the transition interval of the indicator whereby an increase in pH would cause a color change. Such an embodiment however, utilizes a smaller proportion of the transition interval of the indicator material and consequently makes quantitation over a broad range of urea concentrations more difficult.

The second consideration involved in selecting the optimum pH conditions for the test composition resides in the activity of urease under various pH conditions. In this regard it has been found that the optimum pH for urease depends on the particular buffer used, concentration of substrate, ionic strength, and so forth. Generally, however, it can be stated that although urease is active over a relatively broad pH range, it is preferable to buffer the composition in a range of from about pH 5 to about pH 9.

In practice, because of the impracticalities involved in measuring pH in a dry test system such as when the present test composition is incorporated with a carrier member or when such a system is in use, as used herein, the above noted pH parameters apply to the test composition solution used to prepare the dry composition or device.

In the preferred composition utilizing an ammonium ion producing buffer there are a variety of compounds which may be used to buffer the composition to the proper pH. These ammonium ion producing buffers may be generically classified as ammonium salt forming nitrogen compounds and include the ammonium salts of weak organic and inorganic acids as well as amines and amine salts of such acids. Moreover, the compounds must be a solid or at least a high boiling point liquid at room temperature. Examples of such buffers include ammonium citrate, ammonium lactate, ammonium oxalate, ammonium benzoate, ammonium acetate, ammonium salicylate, ammonium stearate, ammonium propionate, ammonium butyrate, ammonium phosphate, tris(hydroxymethyl) aminomethane (TRIS), 2 - amino-2-methyl-1,3-propanediol imidazole, substituted imidazoles, 4-aminopyridine, 2 - amino - 2 - methyl - 1 - propanol, hexamethylenediamine, and acid salts of said amines, and the like as well as mixtures of two or more of such buffers.

It has been found that tris(hydroxymethyl)aminomethane (TRIS) and its acid salts are preferable buffers for use in the present invention.

The amount or proportion of buffer used in the present test composition depends upon the buffering capacity of the particular substance selected and is well within the experimental purview of one skilled in the art of making and using chemical test systems.

Although a wide variety of pH indicators may be used in the present invention, considering the hereinabove noted pH parameters, the preferable indicators are those which have a transition interval within the optimum pH range for urease activity, i.e. pH 5 to pH 9. Since the present invention involves using a composition containing albumin, consideration must be given to selecting an indicator which does not exhibit the so-called protein error phenomenon, or if such an indicator is used, compensation must be made for the pH shift due to the presence of this proteinaceous material. Exemplary of the indicators which may be used are bromthymol blue, bromcresol purple, dichlorosulphonphthalein, 6,8-dinitro-2,4-quinazolinedione, alizarin, 2-(2,4-dinitrophenylazo)-1-naphthol-3,6-disulfonic acid and the like.

It has also been found that the sensitivity and overall quality of the composition of this invention can be further improved by the addition of a sensitizing agent such as an aliphatic amide having a melting point of below about 150° C. Therefore, as used herein, the term sensitizing agent is used to define an adjuvant to the composition which not only allows a more facile quantitation of urea but also improves the overall elegance of the strip and general appearance of the color produced by the presence of urea in the fluid under test. For example, the smoothness and uniformity of color developed by the test composition is dramatically improved by the addition thereto of a sensitizing agent. Preferred sensitizing agents include saturated and unsaturated aliphatic amides containing from about 2 to about 4 carbon atoms. Examples of such sensitizing agents include acetamide, propionamide, acrylamide, butyramide and the like.

The concentration of sensitizing agents used can be varied over a relatively wide range. Generally a concentration of about 0.5% to 10% and higher based on the total weight of the composition can be used without denaturing the urease. However, a concentration of sensitizing agent such as acetamide of about 1.5% to 4.0% is preferred.

The compositions of this invention can be incorporated into various forms of test devices. In a preferred embodiment, bibulous paper strips are impregnated with a test composition as described herein. In use, the resulting test device is contacted with a fluid to be tested and the product of the enzymic reaction, if any, is determined colorimetrically. When the impregnated bibulous strip is contacted with a drop of fluid containing urea, for example, the enzyme system having urease activity catalyzes the hydrolysis of the urea present in the blood with the resulting formation of ammonia, carbon dioxide and possibly other reaction products. The quantity of urea hydrolyzed will cause a certain increment of pH increase which, in turn, causes a color change in the indicator. A correlation between color change and urea concentration can be made to provide a highly sensitive quantitative determination of urea. For example, when bromthymol blue is used in the composition of this invention, the various shades of color between yellow and blue (the colors within the transition interval of bromthymol blue) can be correlated to correspond to different urea levels, thereby giving a clear visible index of the concentration of urea present in the blood.

Although the ingredients comprising the composition of this invention are preferably impregnated into a bibulous carrier, this invention can also be used as a liquid system. A convenient liquid system can be prepared by lyophilizing the composition and then reconstituting with the fluid to be tested. If desired, this invention can be also used in the form of tablets, pellets, powders and the like.

If desired, various additives may be also incorporated into the composition of this invention as protective, thickening or wetting agents. For example, thickening agents such as gelatin or wetting agents such as polyvinyl alcohols and polyethylene glycol can be used. A polyethylene glycol having a molecular weight between 3,000 and 3,700, is particularly useful. Protective agents in the form of semi-permeable films can also be used to enhance the quality of the test composition of this invention when used with certain forms of test devices, for example, such as bibulous strips. Inert dyes to impart a uniform color background may also be used.

A semi-permeable polymeric film, for example, ethyl cellulose, can be used as a dialyzing membrane to keep the larger molecules present in the fluid being tested, such as hemoglobin in blood, out of contact with the test composition while at the same time permitting the remaining porions of the fluid, including any urea present, to pass therethrough and contact the test composition. As a result, staining of the test composition by the hemoglobin in whole blood and the masking red color resulting therefrom are avoided. The aforementioned large molecules can be readily washed or wiped off the polymeric film to permit observation of any resulting color change in the indicator. Further, the polymeric film protects the test composition from decomposition. Although ethyl cellulose is the preferred polymer other semi-permeable film forming polymeric materials such as cellulose acetate, cellulose butyrate, cellulose nitrate and regenerated cellulose can be used if desired.

This invention is illustrated in greater detail in, but is not limited by the following examples:

EXAMPLE I

The composition is formulated as follows:

Gelatin—0.5 g.
Urease (water-soluble)[1] (225.6 SU units)[2]—0.04 g.
Acetamide—0.5 g.
4% "Carbowax 4000"—6.0 ml.
0.1M Ammonium Citrate Buffer (Dibasic)—1.8 ml.
1.6% aqueous solution Bromthymol Blue—3.8 ml.
Bovine albumin—0.2 g.
Gum arabic—0.4 g.

The gelatin was added to 11.5 ml. of water and heated until completely dissolved. The remaining ingredients, including the albumin and gum arabic, were combined and then mixed with the solution of gelatin until a clear solution was obtained. The temperature of the final solution was approximately 30° C. The composition was then adjusted to a pH of about 6.5 by the addition of small quantities of dilute sodium hydroxide. Paper strips measuring 2 inches by ¼ inch were then dipped in the adjusted solution and air dried at a temperature of 85° C. The dried strips were then coated with a polymeric film by dipping the strips into a 1.25% solution of ethyl cellulose in benzene, after which they were allowed to air dry until the benzene completely evolved.

A second composition was prepared exactly like the first composition with the exception that the color stabilizing ingredients, gum arabic and albumin, were removed and a partially water-soluble urease was substituted for the water-soluble urease. The following testing procedure was then followed in determining the blood urea nitrogen (BUN) levels with both compositions. The term BUN is a means of indicating the amount of urea nitrogen in blood and is approximately one half the amount of urea.

The coated ends of both strips were moistened with one drop samples of blood containing known concentrations of urea. After a one-minute incubation time at room temperature, the blood was removed by washing with water. The developed colors of both sticks were immediately compared to color standards which had been previously correlated to indicate the concentration of blood urea nitrogen present in the blood sample. After sixty seconds the sticks were again compared with the color standards. This procedure was repeated a number of times with blood samples containing different concentrations of urea. The results obtained are shown in Table 1.

[1] Water-soluble urease is a highly purified enzyme separated from jack bean and may be obtained through Worthington Biochemical Corp., Freehold, N.J.

[2] A SU (Sumner Unit) of urease activity is that which will form a 1 mg. of ammonia nitrogen from urea in phosphate buffer, pH 7.0 at 20° C. in 5 minutes.

TABLE 1

| Run | Known conc. BUN, mg. percent | Color chart readings in conc. of BUN, mg. percent | | | |
| --- | --- | --- | --- | --- | --- |
| | | 0 seconds reading time | | 60 seconds reading time | |
| | | Composition with color stabilizer | Composition without color stabilizer | Composition with color stabilizer | Composition without color stabilizer |
| 1 | 13 | 10 | 10 | 5 | 0 |
| 2 | 19 | 20 | 20 | 10 | 0 |
| 3 | 30 | 30 | 20 | 25 | 0 |
| 4 | 54 | 50 | 50 | 30 | 10 |
| 5 | 61 | 75 | 75 | 50 | 10+ |
| 6 | 105 | 100 | 75 | 75 | 30 |

The results obtained, clearly show the improvement which can be obtained when a color stabilizer comprising gum arabic and albumin is incorporated into a composition containing a water-soluble urease. In all instances using such stabilizers there was little color fading occurring even after a delayed reading time of 60 seconds.

EXAMPLE II

In this example the critical relationship of gum arabic to albumin is demonstrated by comparing the effect that various weight ratios of gum arabic and albumin have on the composition of Example I.

In all reported runs the formulations and methods of testing were identical to that described in Example I with the exception, as mentioned above, that the ratios of gum arabic to albumin were altered. The concentrations of all other ingredients were held constant.

For each composition tested, the quality of the stabilized color after a delayed reading time of 60 seconds was graded 1 through 5. Number 1 represents poor color quality, number 3 represents fair color quality and number 5 represents excellent color quality of the tested composition. The results obtained are shown in Table 2.

TABLE 2

| Run | Color stabilized composition containing | | Weight ratio of gum arabic: albumin | Color quality grade |
|---|---|---|---|---|
| | Gum arabic, g. used | Albumin, g. used | | |
| 7 | 0.2 | 0.8 | 1:4 | 1 |
| 8 | 0.4 | 0.4 | 1:1 | 3 |
| 9 | 0.4 | 0.2 | 2:1 | 5 |
| 10 | 0.6 | 0.2 | 3:1 | 3 |
| 11 | 0.8 | 0.2 | 4:1 | 1 |

EXAMPLE III

In this example a 2:1 weight ratio of gum arabic to albumin was retained; however, the total concentration of the two ingredients in the composition was altered. The method of testing and grading were identical to that reported in Example II. The results obtained are shown in Table 3.

TABLE 3

| Run | Color stabilized composition containing— | | Total wt. percent of gum arabic and albumin in composition | Color quality grade |
|---|---|---|---|---|
| | Gum arabic, g. | Albumin g. | | |
| 12 | 0.1 | 0.05 | 0.5 | 1 |
| 13 | 0.2 | 0.1 | 1.0 | 3 |
| 14 | 0.4 | 0.2 | 1.9 | 5 |
| 15 | 0.8 | 0.4 | 3.8 | 3 |
| 16 | 1.6 | 0.8 | 7.7 | 1 |

The specific examples herein given illustrate certain preferred embodiments of this invention. It should also be understood that although this invention is of primary interest in determining blood urea nitrogen, it can also be used with modifications in composition and pH adjustment to test various other body fluids such as urine, serum, saliva and the like.

In summary, this invention pertains to a color stabilized test composition, test device and method for the determination of urea utilizing a water-soluble enzyme system having urease activity, an indicator system, a color stabilizing agent and a buffer capable of producing ammonium ions.

What is claimed is:

1. A test composition for detecting urea present in a fluid which comprises urease, a pH indicator, a buffer, and, as a color stabilizer, combination of about 1 part by weight albumin and from about 0.2 to about 6 parts by weight of heteropolysaccharide, said heteropolysaccharide selected from the group consisting of gum arabic, mesquite gum, Damson gum, gum tragacanth and Indian gum.

2. A test composition as in claim 1 wherein the color stabilizer is present in a concentration of from about 0.5% to about 7.7% based on the total weight of composition.

3. A test composition as in claim 1 which additionally comprises from about 0.5% to about 10% by weight of a sensitizing agent selected from the group consisting of acetamide, propionamide, acrylamide and butyramide.

4. A test composition as in claim 3 wherein the sensitizing agent is acetamide.

5. A test composition as in claim 1 wherein the urease is water soluble.

6. A test composition for detecting urea which comprises water-soluble urease, bromthymol blue, a tris(hydroxymethyl) amino methane salt buffer and from about 0.5% to about 7.7% by weight of a color stabilizer comprising one part by weight albumin and from about 0.2 to about 6 parts by weight of a gum arabic.

7. A test device for detecting urea present in a fluid which comprises a carrier member and the dried solids remaining after said carrier member is incorporated with a solution comprising urease, and indicator which undergoes a color reaction in response to a pH change, a buffer, and as a color stabilizer, a combination of about 1 part by weight albumin and from about 0.2 to about 6 parts by weight of heteropolysaccharide, said heteropolysaccharide selected from the group consisting of gum arabic, mesquite gum, Damson gum, gum tragacanth and Indian gum.

8. A test device as in claim 7 wherein the carrier member is of bibulous cellulose material.

9. A test device as in claim 7 wherein the pH of the solution is between the midpoint of the transition interval of the indicator and a point adjacent to and on the acid side of said transition interval.

10. A test device as in claim 7 wherein the carrier member is coated with a semi-permeable polymeric film.

11. A method for detecting urea in a fluid containing the same which comprises contacting said fluid with a composition comprising urease, a pH indicator, a buffer and, as a color stabilizer, combination of about 1 part by weight albumin and from about 0.2 to about 6 parts by weight of heteropolysaccharide, said heteropolysaccharide selected from the group consisting of gum arabic, mesquite gum, Damson gum, gum tragacanth and Indian gum, and observing the color change exhibited by said indicator.

12. The method according to claim 11 wherein the urease is water-soluble.

13. The method according to claim 11 wherein the composition is incorporated with a carrier member.

14. The method according to claim 13 wherein the carrier member is coated with a semi-permeable polymeric film and the method is utilized for detecting urea in whole blood.

15. The method according to claim 14 which additionally comprises the step of washing the carrier member to remove the excess whole blood prior to reading the results obtained.

References Cited

UNITED STATES PATENTS 3,145,086  8/1964  Free et al. _____ 195—103.5

ALVIN E. TANENHOLTZ, Primary Examiner